United States Patent
Jan et al.

(10) Patent No.: US 10,152,294 B2
(45) Date of Patent: Dec. 11, 2018

(54) MOBILE DEVICE AND METHOD OF RUNNING TWO PLATFORM SYSTEMS OR APPLICATIONS THEREON

(75) Inventors: Ren-Jung Jan, Taoyuan (TW);
Yi-Hsuan Feng, Taoyuan (TW);
Hsu-Hong Feng, Taoyuan (TW);
Ludovic Romain Guegan, Taoyuan (TW); Hsin-Ti Chueh, Taoyuan (TW)

(73) Assignee: HTC CORPORATION, Taoyuan (TW)

( * ) Notice: Subject to any disclaimer, the term of this patent is extended or adjusted under 35 U.S.C. 154(b) by 61 days.

(21) Appl. No.: 13/551,926

(22) Filed: Jul. 18, 2012

(65) Prior Publication Data

US 2013/0054843 A1 Feb. 28, 2013

Related U.S. Application Data

(60) Provisional application No. 61/526,446, filed on Aug. 23, 2011.

(51) Int. Cl.
| | |
|---|---|
| *G06F 3/00* | (2006.01) |
| *G06F 3/14* | (2006.01) |
| G06F 13/40 | (2006.01) |
| G06F 13/38 | (2006.01) |
| G06F 9/4401 | (2018.01) |

(52) U.S. Cl.
CPC .......... *G06F 3/1454* (2013.01); *G06F 9/4411* (2013.01); *G06F 13/385* (2013.01); *G06F 13/4068* (2013.01)

(58) Field of Classification Search
None
See application file for complete search history.

(56) References Cited

U.S. PATENT DOCUMENTS

| 8,274,518 B2 | 9/2012 | Blythe |
| 8,544,030 B2 | 9/2013 | Takeuchi |

(Continued)

FOREIGN PATENT DOCUMENTS

| CN | 101814041 A | 8/2010 |
| CN | 102081553 A | 6/2011 |
| CN | 1797345 B | 7/2011 |
| TW | 200905550 A | 2/2009 |
| TW | 201042466 A | 12/2010 |

OTHER PUBLICATIONS

German Office Action dated Feb. 5, 2013.

(Continued)

*Primary Examiner* — Henry Tsai
*Assistant Examiner* — Aurangzeb Hassan
(74) *Attorney, Agent, or Firm* — McClure, Qualey & Rodack, LLP

(57) ABSTRACT

A mobile device and methods of running two platform systems or applications on the mobile device are disclosed in this invention. The mobile device includes a processing unit, a display unit and an I/O interface unit. The processing unit is configured to execute a first application of a first platform system and a second application of a second platform system different from the first platform system. The display unit is configured to display a graphic user interface of the first application. The I/O interface unit is configured to build connection to an external device and transmit data of a graphic user interface data of the second application to the external device.

20 Claims, 7 Drawing Sheets

(56) References Cited

U.S. PATENT DOCUMENTS

| | | | |
|---|---|---|---|
| 2006/0146057 A1* | 7/2006 | Blythe | G06F 9/45537 345/506 |
| 2009/0023395 A1 | 1/2009 | Chang et al. | |
| 2009/0298535 A1 | 1/2009 | Klein et al. | |
| 2009/0037825 A1 | 2/2009 | Thrasher et al. | |
| 2010/0064228 A1* | 3/2010 | Tsern | G06F 3/1415 715/740 |
| 2010/0115149 A1* | 5/2010 | Ewer | H04M 1/6066 710/19 |
| 2010/0216508 A1 | 8/2010 | Ma et al. | |
| 2010/0261506 A1 | 10/2010 | Rajamani et al. | |
| 2010/0306501 A1 | 12/2010 | Chang et al. | |
| 2010/0317332 A1* | 12/2010 | Bathiche et al. | 455/418 |
| 2011/0191516 A1* | 8/2011 | Xiong et al. | 710/305 |
| 2012/0233622 A1 | 9/2012 | He et al. | |
| 2013/0054843 A1* | 2/2013 | Jan | G06F 3/1454 710/16 |

OTHER PUBLICATIONS

German Office Action dated Apr. 5, 2013.
S. Lee and J.W. Jeon, "Evaluating Performance of Android Platform Using Native C for Embedded Systems. In: Proc. of International Conference on Control, Automation and Systems" Oct. 27-30, 2010, S. 1160-1163.
"Android software development" Wikipedia, Jul. 29, 2011.
Taiwan Office Action dated Aug. 15, 2014.
English translation of abstract of TW 200905550 (published Feb. 1, 2009).
English translation of abstract of TW 201042466 (published Dec. 1, 2010).
Office Action issued in corresponding Chinese patent application dated Nov. 5, 2015.
China Office Action dated Apr. 3, 2015.
Taiwan Office Action dated Jan. 5, 2015.
English translation of abstract of CN 1797345 B (published Jul. 13, 2011).

* cited by examiner

MOBILE DEVICE AND METHOD OF RUNNING TWO PLATFORM SYSTEMS OR APPLICATIONS THEREON

RELATED APPLICATIONS

The application claims priority to Provisional Application Ser. No. 61/526,446 filed on Aug. 23, 2011, which is herein incorporated by reference.

BACKGROUND

Field of Invention

The present invention relates to a mobile device. More particularly, the present invention relates to a mobile device with two co-existing platform systems or applications.

Description of Related Art

Recently, mobile communication devices become common belongings to everyone in modern society. For example, mobile phones, personal digital assistants, smart phones and tablet computers are widespread in various applications. The smart phone is popular among these mobile devices, because the smart phone has a compact size and various functions such as internet surfing, multimedia message transmitting, file sharing, document editing, photo shooting and paper reading.

In order to maintain high portability, most of the smart phones have palm-sized display panels served as displaying interfaces of digital information. The palm-sized display panels should be enough for traditional applications such as phone dialing and text message typing. However, the palm-sized display panels are not big enough for applications such as internet surfing, photo editing and paper reading.

Most smart phones run a mobile platform system (mobile OS), which is mainly designed for the mobile devices like phones, tablet computers or personal digital assistants. For example, Android system and iOS are common platform systems designed for phones and tablet computers. The mobile platform systems for mobile devices have lower power consumption, intuitive user interfaces and capabilities for some simple functions. However, the mobile platform system is mainly designed for driving a palm-sized displaying screen and incapable of driving a screen of a larger size.

In addition, some professional or useful software (e.g., software for document edition, three-dimensional figuration or file conversion) do not have a mobile version or cannot be executed on the mobile platform systems, such that applications or capabilities of the mobile platform systems are limited.

SUMMARY

In order to solve the aforesaid problem, this disclosure provides a mobile device and a controlling method thereof.

An aspect of the disclosure is to provide a mobile device, which includes a processing unit, a display unit and an I/O interface unit. The processing unit is configured to execute a first application of a first platform system and a second application of a second platform system different from the first platform system. The display unit is configured to display a graphic user interface of the first application. The I/O interface unit is configured to build connection to an external device and transmit data of a graphic user interface data of the second application to the external device.

According to an embodiment of the disclosure, the processing unit is further configured to launch the second application in response to the external device is connected to the mobile device.

According to an embodiment of the disclosure, the processing unit is further configured to determine which second application is launched according to a type of the external device.

According to an embodiment of the disclosure, the processing unit is configured to execute the first application and the second application concurrently on the same kernel. The first platform system is a native mobile platform system.

According to an embodiment of the disclosure, the connection of the external device is built by hot-plug.

According to an embodiment of the disclosure, the connection is one of the following: HDMI, WiFi, DLNA and USB.

According to an embodiment of the disclosure, the first platform system is a native mobile platform system, and the second platform system is another platform system using the same kernel as the first platform system.

According to an embodiment of the disclosure, the mobile device further includes a memory unit accessible to the first application and the second application via a communication channel.

Another aspect of the disclosure is to provide a method of running two platform systems on a mobile device. The method includes steps of: running a first platform system on the mobile device; detecting connection of the mobile device to an external device having an external display unit; launching a second platform system on the mobile device in response to the connection to the external device is detected; and, running the second platform system on the mobile device concurrently with the first platform system.

According to an embodiment of the disclosure, the method further includes steps of: providing a graphic user interface of the second platform system to the external device; and, displaying the graphic user interface of the second platform system on the external display unit.

According to an embodiment of the disclosure, the method further includes a step of: pausing the second operation system on the mobile device in response to the external device is disconnected to the mobile device.

According to an embodiment of the disclosure, the method further includes steps of: receiving control signal corresponding to the second platform system from an external control device; and, processing the control signal in the second platform system by the mobile device.

According to an embodiment of the disclosure, the launching of the second platform system is enabled by the first platform system.

According to an embodiment of the disclosure, the method further includes steps of: executing an application on the first platform system and the second platform system concurrently; and, transmitting data of the application between the first platform system and the second platform system via a communication channel.

Another aspect of the disclosure is to provide a method for running two applications on a mobile device. The method includes steps of: executing a first application on the mobile device; providing a graphic user interface of the first application on a first display unit residing within the mobile device; executing a second application on the mobile device; and, providing a graphic user interface of the second application on a second display unit of an external device.

According to an embodiment of the disclosure, the method further includes steps of: detecting connection of the mobile device to the external device; and, providing the graphic user interface of the second application on the second display unit in response to the connection is detected.

According to an embodiment of the disclosure, the method further includes a step of: transmitting data from the first application to the second application via a communication channel.

According to an embodiment of the disclosure, the method further includes steps of: obtaining the data by the first application; and, automatically transmitting the data to the second application. The first application and the second application are cross-platform system applications According to an embodiment of the disclosure, the first application and the second application are executed concurrently by a processing unit within the mobile device.

According to an embodiment of the disclosure, the first application is executed in a native mobile platform system and the second application is executed in another platform system.

BRIEF DESCRIPTION OF THE DRAWINGS

The invention can be more fully understood by reading the following detailed description of the embodiment, with reference made to the accompanying drawings as follows.

DETAILED DESCRIPTION

The invention provides system and method for operating two or more applications on a mobile device; particularly for two or more applications run in different environments. By sharing a common kernel, the mobile device is capable to run two platform systems concurrently and share information and/or data between applications executed in the two platform systems.

Figure 1:
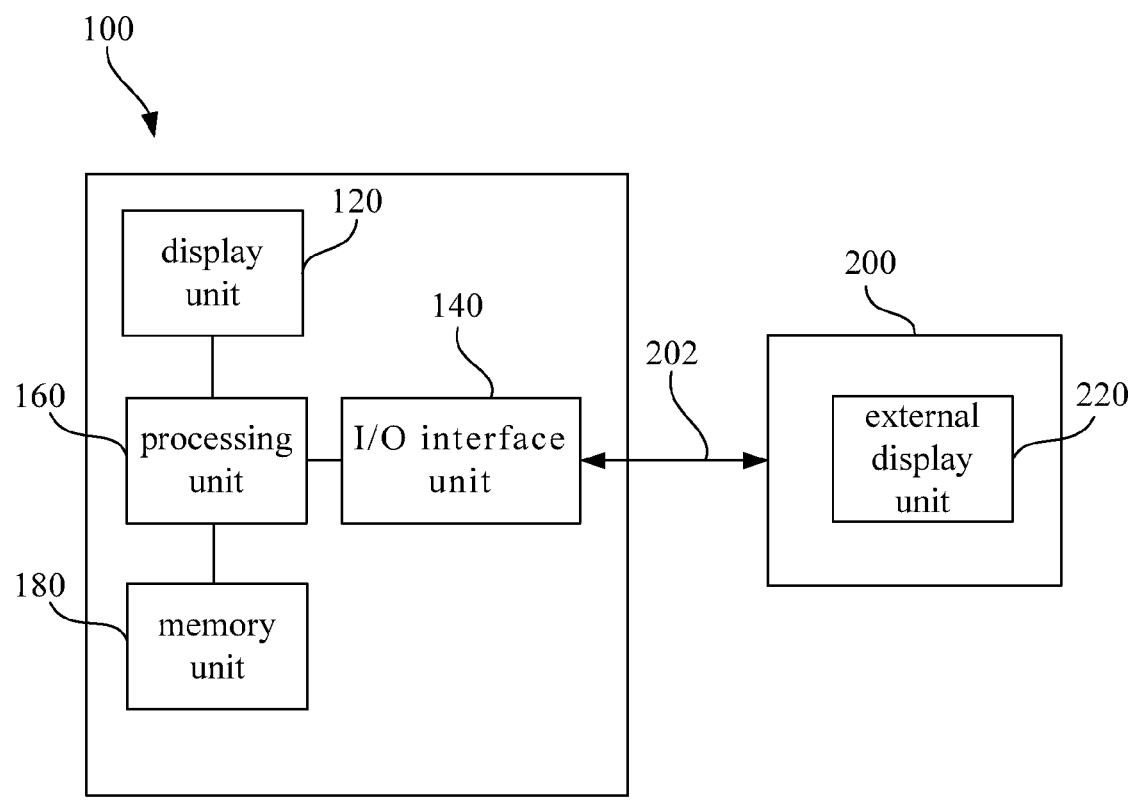
FIG. 1 is a functional block diagram illustrating a mobile device according to an embodiment of the disclosure.

FIG. 1 is a functional block diagram illustrating a mobile device 100 according to an embodiment of the invention. As shown in FIG. 1, the mobile communication device 100 includes a display unit 120, an I/O interface unit 140 and a processing unit 160. In this embodiment, the display unit 120 is a built-in display screen of the mobile device 100.

As shown in FIG. 1, the I/O interface unit 140 of the mobile communication device 100 is used for forming a removable transmission connection 202 to an external device 200. The external device 200 comprises an external display unit 220. For example, the mobile device 100 can be a smart phone, tablet or an equivalent mobile device with a relatively small size screen (i.e., the built-in display module 190), and the external device 200 can be a personal computer, or any electronic device having an external display unit or an equivalent expansion display device with a larger screen (i.e., external display unit 220). The mobile device 100 may connect to the external device 200 via the I/O interface unit 140. In the embodiment, the I/O interface unit 140 can support wired or wireless connection, for example HDMI, WiFi, DLNA and USB and/or other suitable protocol.

Figure 2:
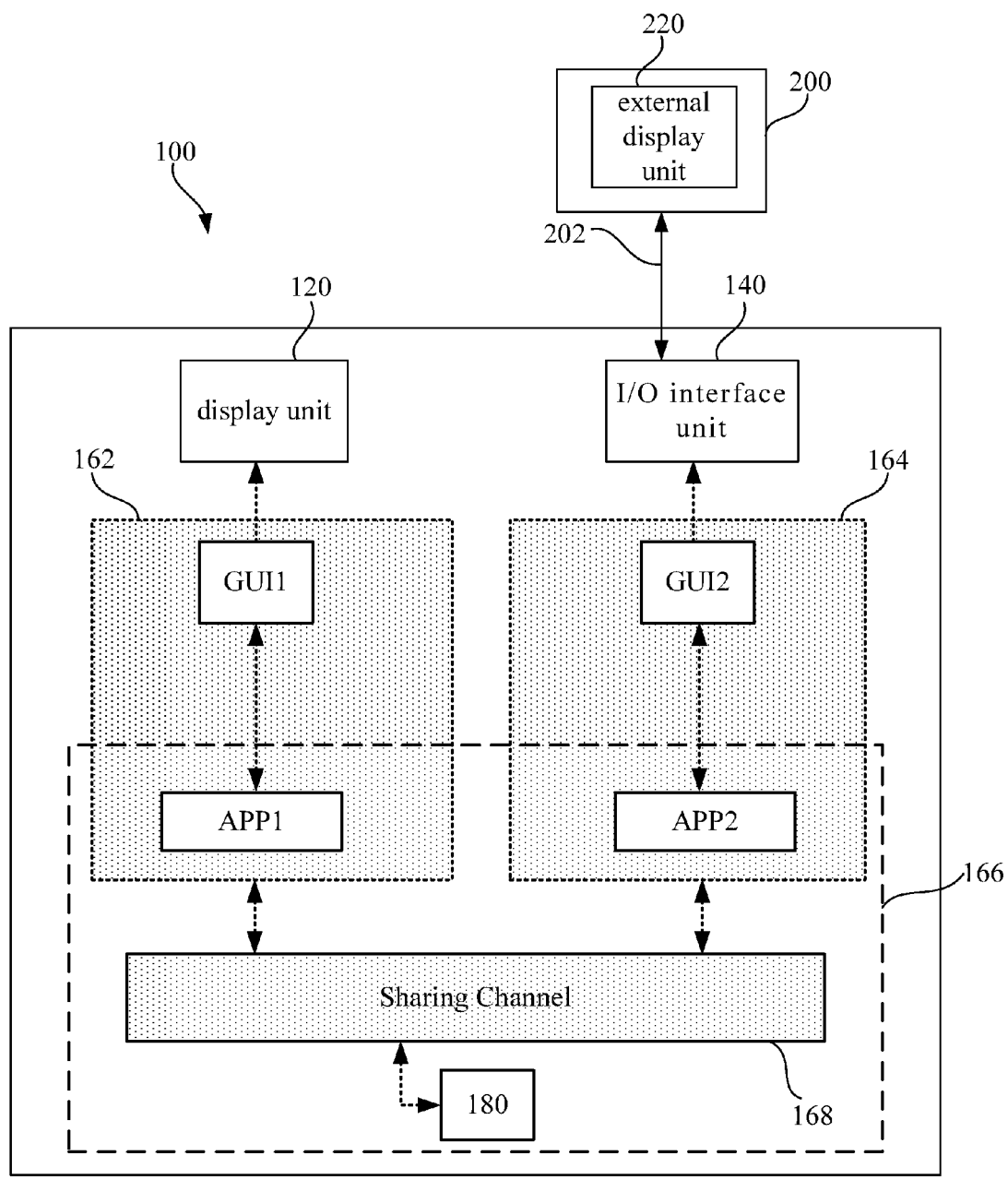
FIG. 2 is a software structural diagram illustrating the mobile device in FIG. 1 according to an embodiment of the disclosure.

Reference is made to FIG. 2 at the same time. FIG. 2 is a software structural diagram illustrating the mobile device 100 in FIG. 1 according to an embodiment of the invention.

In this embodiment, two or more platform systems can co-exist on the mobile device 100, for example a first platform system 162 and a second platform system 164. In an embodiment of the invention, the platform systems may have different application frameworks, but share the same kernel and hardware. The first platform system 162 can be a native mobile operating system on the mobile device 100. For example, the first platform system 162 can be an Android mobile system, Symbian operating system, Maemo operating system, MeeGo operating system, iOS operating system, BlackBerry operating system, Windows Mobile operating system, WebOS operating system, Bada operating system or any equivalent platform system. On the other hand, the second platform system 164 is different from the native mobile platform system (i.e., the first platform system 162) on the mobile device 100. In this embodiment, the second platform system 164 is another platform system using the same kernel 166 as the first platform system 162. For example, the second platform system 164 can be a Linux based operating system, X-window system or any equivalent platform system, such as Ubuntu. The first platform system 162 and the second platform system 164 operates on the same kernel 166, e.g., a Linux kernel.

In this embodiment, the processing unit 160 of the mobile device 100 is configured to execute a first application APP1 of the first platform system 162 and a second application APP2 of the second platform system 164 selectively according to a user instruction. Due to the processing capability limit, the mobile device 100 may provide content display of one platform system on the display unit 120 at a time. Therefore, user may only see graphic user interface GUI1 of the first application APP1 on the display unit 120 of the mobile device 100 since it is executed in the first platform system, which might the native operating system of the mobile device. In order to view content display of the second application APP2 of the second platform system, the mobile device has to switch from the first platform system to the second platform system. Even though the mobile device 100 is capable to run two or more platform systems, user is still unable to perform tasks on two platform systems at the same time.

Therefore, the invention provides a solution that would allow user to perform tasks of two applications executed in different platform systems concurrently. When the mobile device 100 is not connected with the external device 200, the processing unit 160 executes a first application APP1 of the first platform system 162 on the mobile device 100 and provides the graphic user interface GUI1 of the first application APP1, which is displayed on the display unit 120 of the mobile device 100. In this situation (the mobile device 100 is not connected to the external device 200), the second operation system 164 is paused, standby or even not launched on the mobile device 100.

The first application APP1 can be an application program for general purposes (e.g., phone dialing, power management, user interaction, and other basic or user-installed functions on a mobile phone) native to the mobile device 100.

When the external device 200 is connected to the mobile device 100, the processing unit 160 is further configured to launch the second platform system 164 and corresponding second application APP2 on the mobile device 100. In some embodiments, the connection between the mobile device 100 and the external device 200 can be built by hot-plug. In other embodiments, there may be more than one second application APP2 existing on the second platform system 164 for different functions. For example, the second platform system 164 may include application programs for professional drawing, video converting, music recording and document editing or some equivalent functions. In this embodiment, the processing unit 160 may be further configured to determine which second application APP2 to be launched according to the type of the external device 200. In addition, the second application APP2 on the second platform system 164 may have more advanced features compared to the first application APP1 of the native platform system 162 on the mobile device 100, or not originally supported by the first platform system 162.

When the external device 200 is connected to the mobile device 100, the processing unit 160 is configured to execute the first application APP1 on the first platform system 162 and the second application APP2 on the second platform system 164 concurrently. Also, graphic user interface GUI1 and GUI2 can be provided on the display unit 120 and the external display unit 220 respectively. In this embodiment, the first platform system 162 and the second platform system 164 may share the same kernel 166, but have different frameworks. In one embodiment of the invention, the processing unit 160 can be a processor based on Advanced RISC Machine (ARM) structure, but the invention is not limited to this.

As shown in FIG. 2, the first application APP1 of the first platform system 162 and the second application APP2 of the second platform system 164 may interchange information through a communication channel 168 established on the kernel 166. For example, the mobile device 100 may further include a memory unit 180, which is accessible to the first application APP1 and the second application APP2 via the communication channel 168. The memory unit 180 may be allocated for storing information which could be accessed or used by two or more applications across platform systems. For example, image data may be captured and stored by a camera application of the first platform system 162, and be accessed and modified by a photo editor application of the second platform system 164. By storing the information to be exchanged into the memory unit 180, the information can be read by the target application on either platform system, so as to complete the interchange between two platform systems on the mobile device 100. Please be noted that the memory unit 180 may be any type of storage device, such as SD memory card, internal disk, flash memory, or any suitable kind.

Figure 3:
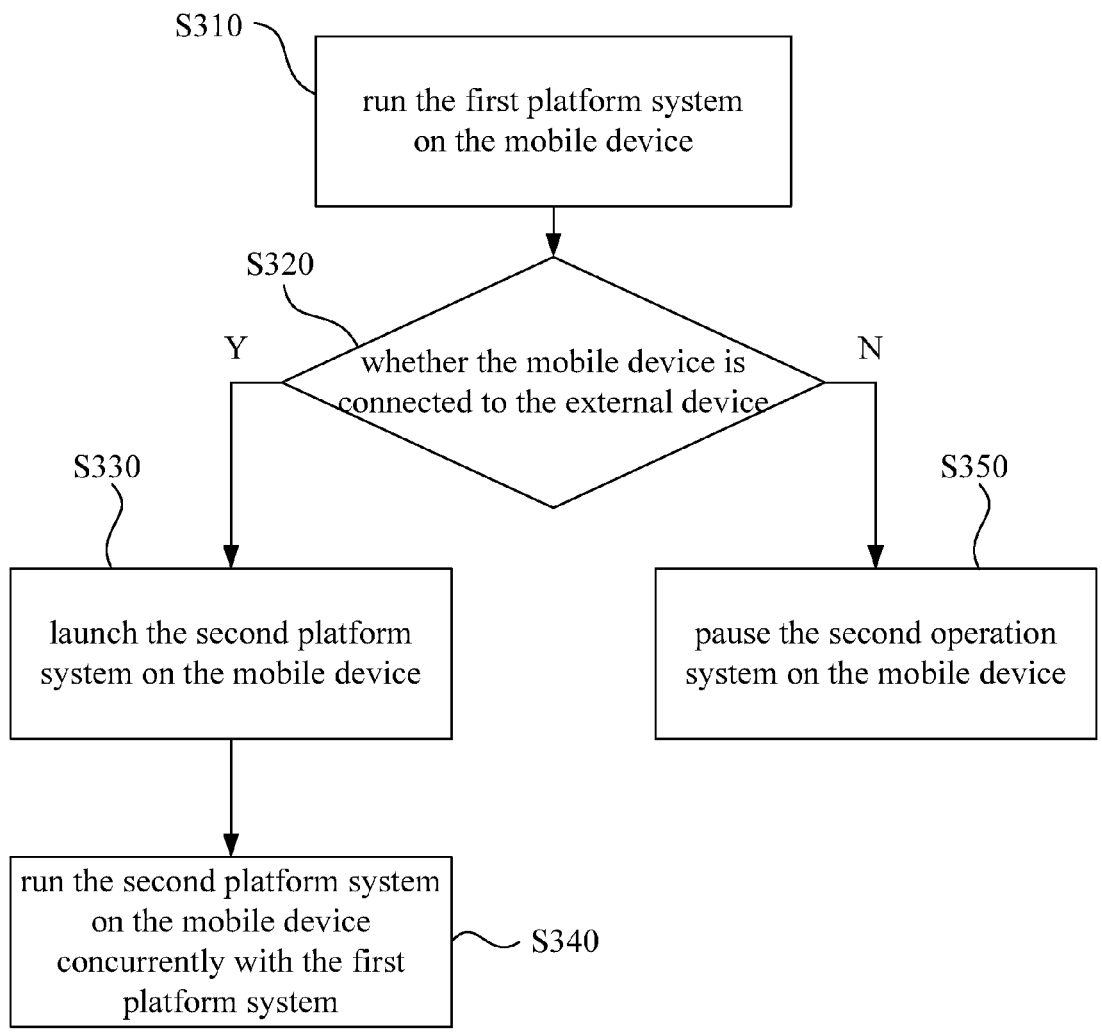
FIG. 3 is a flow chart diagram illustrating a method of running two platform systems on the mobile device according an embodiment of the disclosure.

The mobile device 100 in the invention may activate or terminate the second display procedure according to the existence of the transmission connection 202 between the I/O interface unit 140 and the external device 200. The behavior and the controlling procedure of aforesaid function are disclosed in the following paragraphs with reference of FIG. 3. FIG. 3 is a flow chart diagram illustrating a method of running two platform systems on the mobile device 100 according an embodiment of the invention.

As shown in FIG. 3 and FIG. 2, step S310 of the method in the embodiment is performed for running a first platform system 162 on the mobile device 100. The first platform system 162 is a native platform system corresponds to general requests on the mobile device 100 under a default condition. Step S320 is performed for detecting connection of the mobile device 100 to the external device 200, which has an external display unit 220. The detection may be performed by the I/O interface unit 140 depending on the connection protocol. In addition to detection of connection, the I/O interface unit 140 may also receive and transmit information related to the external device 200 to the processing unit 160, for example identity of the external device 200, supported display resolution and frame rate of the external display unit 220, and/or others.

When the connection to the external device 200 is detected, step S330 is performed for launching a second platform system 164 on the mobile device 100 in response to the connection from the mobile device 100 to the external device 200. In this embodiment, the launching of the second platform system 164 is enabled by the first platform system 162. The first operation system 162 may launch the second platform system 164 according to the information related to the external device 200. For different type of external device 200, different second operation system 164 may be launched respectively.

During aforesaid step S320, whether the connection between the I/O interface unit 140 and the external device 200 is initialized successfully can be determined in at least two ways. One of the embodiments involves utilizing the processing unit 160 to detect whether an interface connection statue log file is existed in the kernel 166 of the mobile device 100, such that the processing unit 160 can determine if the connection is initialized successfully or not. Another embodiment involves utilizing a driver program of the I/O interface unit 140 to generate a connection statue signal when the connection is established, and utilizing the processing unit 160 to determine whether the transmission connection is initialized successfully according to the connection statue signal. In other embodiment of the invention, the connection can also be built and determined by remote procedure call or using intent in Android platform.

Afterward, step S340 is performed for running the second platform system 164 on the mobile device 100 concurrently with the first platform system 162. User may operate applications of the first platform system 162 via display unit 120 built-in on the mobile device 100 and operate applications of the second platform system 164 via the external display unit 220 concurrently.

On the other hand, if the connection to the external device 200 is not detected in step S320, the method further performs step S350 for pausing the second operation system 164 on the mobile device 100 in response to the external device 200 is not connected to the mobile device 100. In another embodiment of the invention step S350 may be skipped in response to the second platform system is not activated for running previously.

Figure 4:
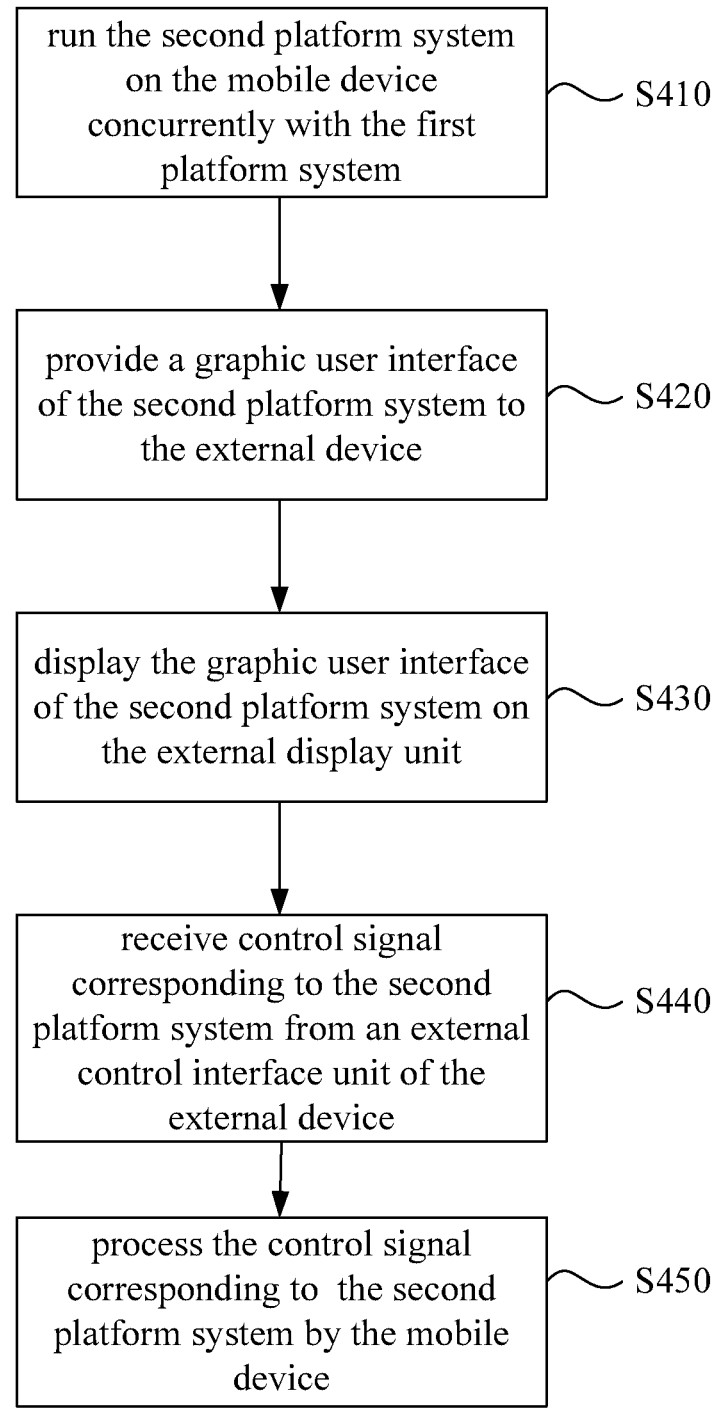
FIG. 4 is a flow chart diagram illustrating an embodiment of the method in FIG. 3 after the first platform system and the second platform system are running concurrently.

FIG. 4 is a flow chart diagram illustrating an embodiment of the method in FIG. 3 in the condition that the first platform system 162 and the second platform system 164 are running concurrently.

As shown in FIG. 4 and FIG. 2, the first platform system 162 and the second platform system 164 on the mobile device 100 are running concurrently in step S410, the method further performs step S420 for providing a graphic user interface GUI2 of the second platform system 164 to the external device 200. The graphic user interface GUI2 may correspond to the second platform system 164 or an application executed in the second platform system 164, and be provided via the I/O interface unit 140. In step S320 of detecting connection to the external device 200, the I/O interface unit 140 may also receive information related to the external device and transmit to the processing unit 160, for example type and identity of the external device 200, supporting resolution and frame rate of the external display unit 220. The graphic user interface GUI2 may be provided with proper settings according to the information.

Afterward, step S430 is performed for displaying the graphic user interface GUI2 of the second platform system 164 on the external display unit 220. Then, step S440 is performed for receiving control signal corresponding to the second platform system 164 from an external control interface unit (not shown) of the external device 200. The external control interface unit may be a mouse, keyboard, joystick, touchpad, stylus and/or other suitable devices. And step S450 is performed for processing the control signal corresponding to the second platform system 164 by the mobile device 100.

Figure 5:
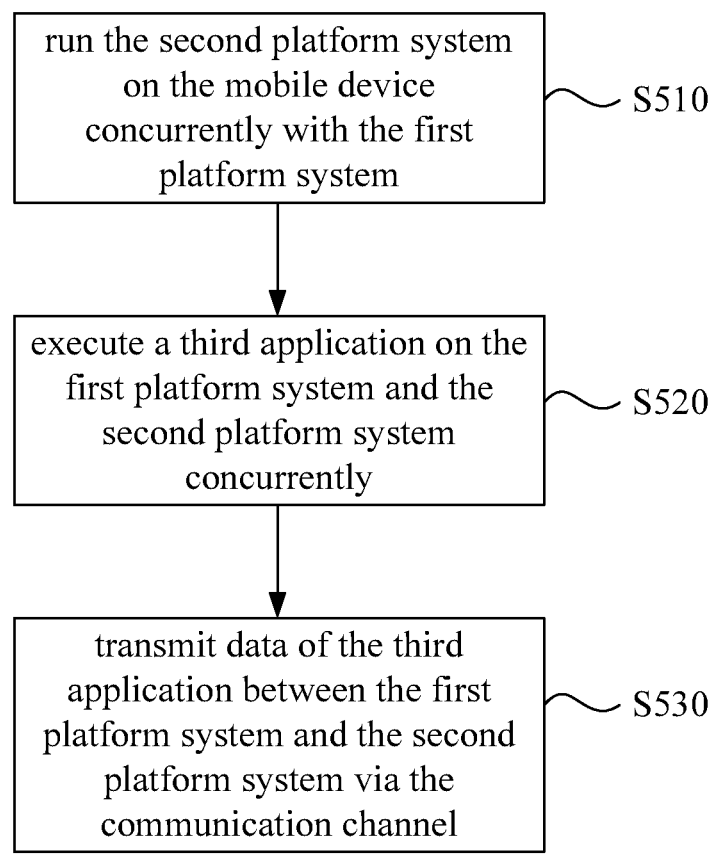
FIG. 5 is a flow chart diagram illustrating another embodiment of the method in FIG. 3 after the first platform system and the second platform system are running concurrently.
Figure 6:
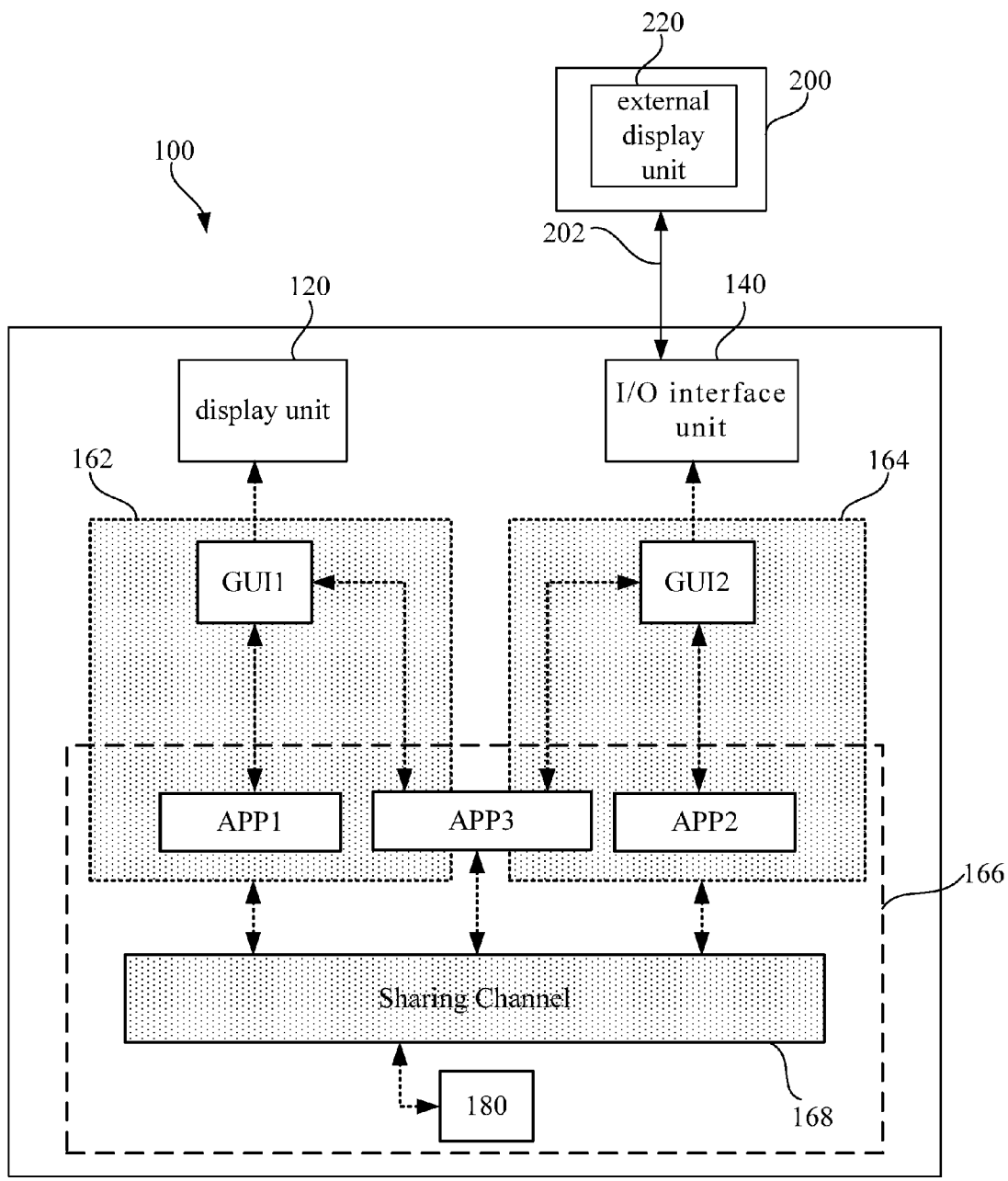
FIG. 6 is a software structural diagram illustrating the mobile device according to the embodiment shown in FIG. 5.

Reference is made to FIG. 5 and FIG. 6. FIG. 5 is a flow chart diagram illustrating another embodiment of the method in FIG. 3 in the condition that the first platform system 162 and the second platform system 164 are running concurrently. FIG. 6 is a structural diagram illustrating the mobile device 100 according to the embodiment shown in FIG. 5.

As shown in FIG. 5 and FIG. 6, the first platform system 162 and the second platform system 164 on the mobile device 100 are running concurrently in step S510 (referring to FIG. 3 for steps before S340), the method further performs step S520 for executing a third application APP3 on the first platform system 162 and the second platform system 164 concurrently. As shown in FIG. 6, the third application APP3 is a cross-platform application. Afterward, the method further performs step S530 for transmitting data of the third application APP3 between the first platform system 162 and the second platform system 164 via the communication channel 168. In another embodiment of the invention, the third application APP3 may also exchange data with application APP1 or APP2 via the communication channel 168.

Afterward, when the connection between the I/O interface unit 140 and the external device 200 is removed, the processing unit 160 is triggered to shut down or suspend the second platform system 164.

Figure 7:
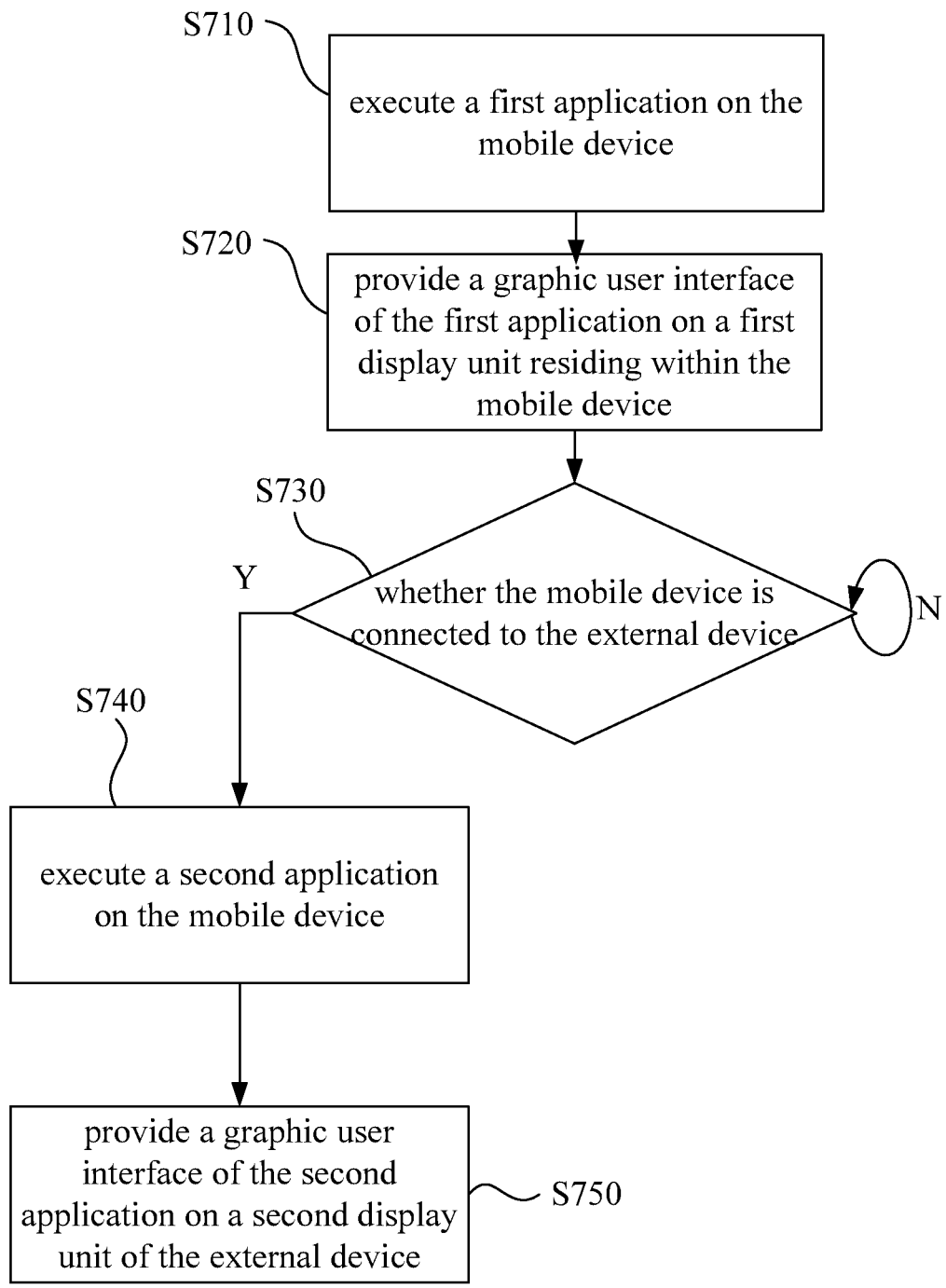
FIG. 7, which is another flow chart diagram illustrating a method of running two applications on the mobile device according an embodiment of the disclosure.

Reference is also made to FIG. 7, which is another flow chart diagram illustrating a method of running two applications on the mobile device 100 according an embodiment of the disclosure.

Step S710 of the method in the embodiment is performed for executing a first application on the mobile device. The first application may be an application run on a first framework. Step S720 is performed for providing a graphic user interface of the first application on a first display unit residing within the mobile device.

Step S730 is performed for detecting connection of the mobile device to the external device. When the connection to the external device 200 is detected, step S740 is performed for executing a second application on the mobile device. In this embodiment, the executing of the second application is launched by the first application. The second application may be an application run on a second framework different from the first framework. The data from the first application to the second application is transmitted via a communication channel. The communication channel is built by a common kernel shared by the first framework and the second framework. In addition, the first application and the second application are executed concurrently by a processing unit within the mobile device. Please be noted that the first framework may be of a first platform system native to the mobile device, and the second framework may be of a second platform system, or a desktop environment, X-windows environment and/or other suitable kinds.

Afterward, step S750 is performed for providing the graphic user interface of the second application on the second display unit in response to the connection is detected.

There are two embodiments of the first application and the second application of the method shown in FIG. 7. As in one embodiment corresponding to FIG. 7 and FIG. 2, the first application (as APP1 shown in FIG. 2) is executed in a native mobile platform system 162 and the second application (as APP2 shown in FIG. 2) is executed in another platform system 164.

As in another embodiment corresponding to FIG. 7 and FIG. 6, the first application and the second application are cross-platform system applications (as APP3 shown in FIG. 6). In this case, the data between cross-platform system applications interchange automatically. For example, the data obtaining by the first application APP1 can be automatically transmitted to the second application APP2 via the communication channel 168. On the other hand, the data obtaining by the second application APP2 can be automatically transmitted to the first application APP1 via the communication channel 168 as well, such that the cross-platform system applications are formed.

In summary, the disclosure provides a mobile device capable of running two platform systems at once, and methods of controlling the behavior between two platform systems. The mobile device may execute an application on a native platform system in default. When the mobile device is connected to an external device, the mobile device automatically launches another application on a platform system different from the native platform system on the mobile device. The second application in response to the connection can be utilized to provide a graphic user interface on an external device. Therefore, the functions of the mobile device are not limited by the built-in display unit on the mobile device. In addition, the mobile device may launch different application according to the type of the external device.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A mobile device, comprising:
    a processing unit, configured to execute a first application of a first operating system and a second application of a second operating system different from the first operating system, wherein the first operating system and the second operating system share a same kernel, and the first application of the first operating system and the second application of the second application interchange information through a communication channel established on the kernel shared by the first operating system and the second operating system;
    a first display unit, configured to display a first graphic user interface of the first application; and
    an I/O interface unit, configured to build connection to an external device and transmit data of a second graphic user interface of the second application to the external device, so as to allow an external display unit of the external device to display the second graphic user interface, wherein the first operating system is launched and the second operating system is not launched responsive to the I/O interface unit and the external device not being connected, and in response to the processing unit detecting connection between the I/O interface unit and the external device after the first operating system is launched, the first operating system launches the second operating system.

2. The mobile device of claim 1, wherein the processing unit is further configured to determine the second application to be launched according to a type of the external device.

3. The mobile device of claim 1, wherein the processing unit is configured to execute the first application and the second application concurrently on the same kernel, and the first operating system is a native mobile operating system.

4. The mobile device of claim 1, wherein the connection of the external device is built by hot-plug.

5. The mobile device of claim 1, wherein the connection is built in wired or wireless protocol, and can be one of the following: HDMI, WiFi, DLNA and USB.

6. The mobile device of claim 1, wherein the first operating system and the second operating system have different frameworks.

7. The mobile device of claim 1, further comprising a memory unit accessible to the first application and the second application via the communication channel.

8. A method of running two operating systems on a mobile device, comprising:
running a first operating system on the mobile device;
displaying a first graphic user interface of a first application executed by the first operating system on a first display unit of the mobile device;
launching the first operating system and not launching a second operating system on the mobile device responsive to the mobile device and an external device not being connected;
detecting connection of the mobile device to the external device having an external display unit after the first operating system is launched;
launching, through the first operating system, the second operating system on the mobile device in response to the connection of the mobile device to the external device is detected;
running the second operating system on the mobile device concurrently with the first operating system; and
displaying a second graphic user interface of a second application executed by the second operating system on the external display unit of the external device, wherein the first operating system and the second operating system share a same kernel, and the first application of the first operating system and the second application of the second application interchange information through a communication channel established on the kernel shared by the first operating system and the second operating system.

9. The method of claim 8, further comprising:
providing a graphic user interface of the second operating system to the external device; and
displaying the graphic user interface of the second operating system on the external display unit.

10. The method of claim 8, further comprising:
pausing the second operating system on the mobile device in response to the external device is disconnected to the mobile device.

11. The method of claim 8, further comprising:
receiving control signal corresponding to the second operating system from an external control device; and
processing the control signal in the second operating system by the mobile device.

12. The method of claim 8, wherein the launching of the second operating system is enabled by the first operating system.

13. The method of claim 8, further comprising:
executing an application on the first operating system and the second operating system concurrently; and
transmitting data of the application between the first operating system and the second operating system via the communication channel.

14. A method for running two applications on a mobile device, comprising:
executing a first application of a first operating system on the mobile device;
providing a graphic user interface of the first application on a first display unit residing within the mobile device;
launching the first operating system and not launching a second operating system on the mobile device responsive to the mobile device and an external device not being connected;
detecting connection of the mobile device to the external device after the first operating system is launched;
launching, through the first operating system, the second operating system on the mobile device in response to the connection of the mobile device to the external device is detected;
executing a second application of the second operating system on the mobile device, wherein the first operating system and the second operating system share a same kernel, and the first application of the first operating system and the second application of the second application interchange information through a communication channel established on the kernel shared by the first operating system and the second operating system; and
providing a graphic user interface of the second application on an external display unit of the external device.

15. The method of claim 14, further comprising:
detecting connection of the mobile device to the external device; and
providing the graphic user interface of the second application on the external display unit in response to the connection is detected.

16. The method of claim 14, further comprising:
transmitting data from the first application to the second application via the communication channel.

17. The method of claim 15, further comprising:
obtaining the data by the first application; and
automatically transmitting the data to the second application;
wherein the first application and the second application are cross-platform system applications.

18. The method of claim 14, wherein the execution of the first application and the second application are performed concurrently on the same kernel by a processing unit within the mobile device.

19. The mobile device of claim 1, wherein the second operation system is paused in response to the external device is disconnected from the mobile device.

20. The method of claim 14, further comprising:
pausing the second operation system in response to the external device is disconnected from the mobile device.

\* \* \* \* \*